(No Model.) 2 Sheets—Sheet 2.

J. G. STAUNTON.
PORTABLE RUNWAY FOR POULTRY HOUSES.

No. 366,696. Patented July 19, 1887.

Witnesses:
A. C. Rawlings
S. M. Pool

Inventor:
J. Galusha Staunton,
by Johnson and Johnson
Attys.

N. PETERS, Photo-Lithographer, Washington, D. C.

UNITED STATES PATENT OFFICE.

J. GALUSHA STAUNTON, OF ELLICOTTVILLE, NEW YORK.

PORTABLE RUNWAY FOR POULTRY-HOUSES.

SPECIFICATION forming part of Letters Patent No. 366,696, dated July 19, 1887.

Application filed July 29, 1885. Renewed December 29, 1886. Serial No. 222,884. (No model.)

*To all whom it may concern:*

Be it known that I, J. GALUSHA STAUNTON, a citizen of the United States, residing at Ellicottville, in the county of Cattaraugus and State of New York, have invented new and useful Improvements in Portable Runways for Poultry-Houses, of which the following is a specification.

My invention relates to the class called "poultry-culture;" and the object of the present improvement, which forms one branch of a system of poultry-culture appliances, is to provide an inclosed portable hinged sectional runway of open-work leading from the poultry-house, or any permanent runway communicating therewith, to the creel, for the purpose of changing the position of the pasture-range as it becomes necessary, and to render such runway capable of being easily handled and folded for transportation.

The primary feature of the improvement is an inclosed runway in sections designed to be placed by sections end to end, for the purpose of conducting the fowls to any desired spot for forage, the said hinged sections being open at each end, and rendered self sustaining when in use by the beveling of the meeting sides of the top strips, and connecting them by loop-hinges to limit their spreading.

Figure 1:
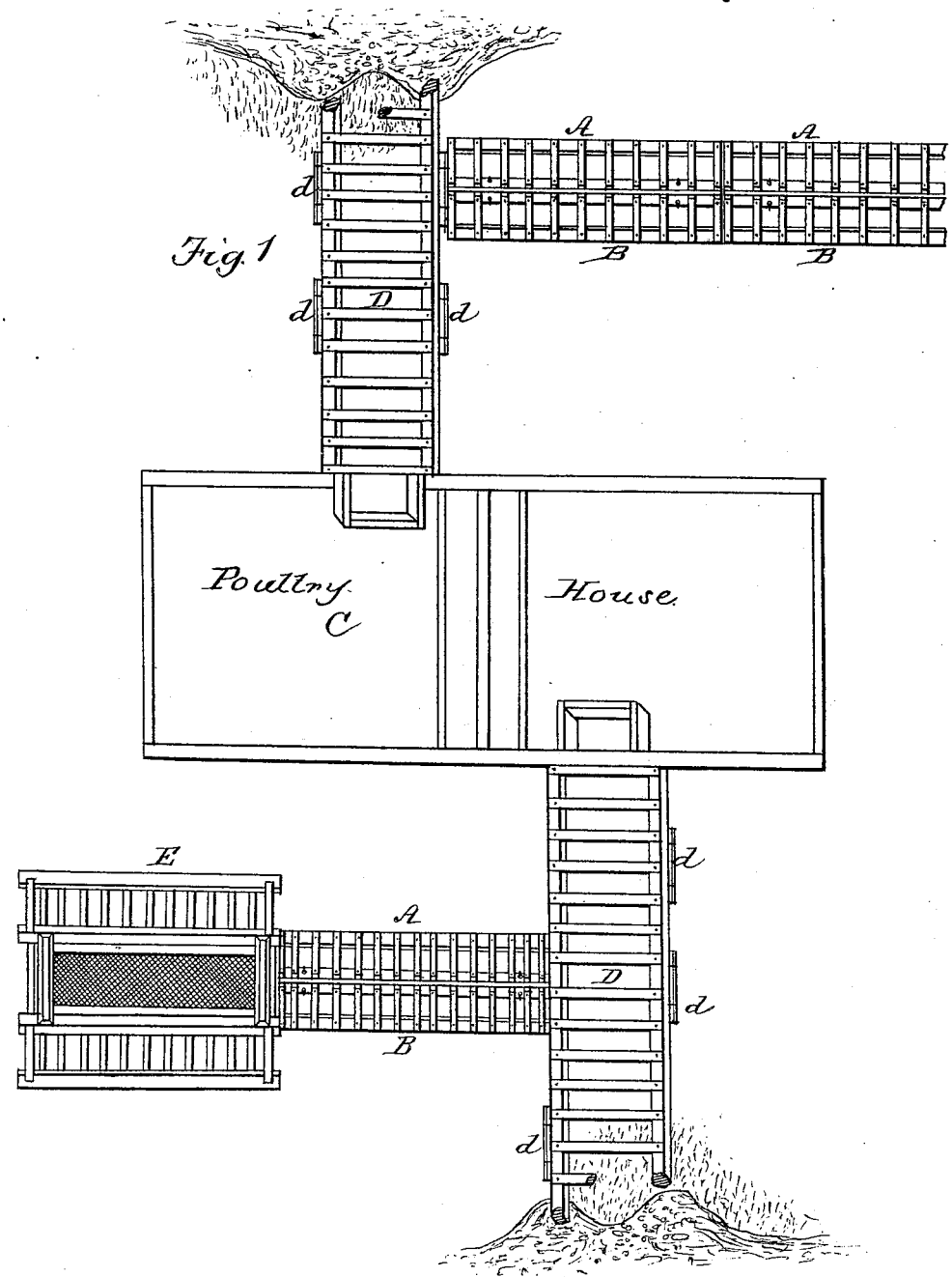
Figure 2:
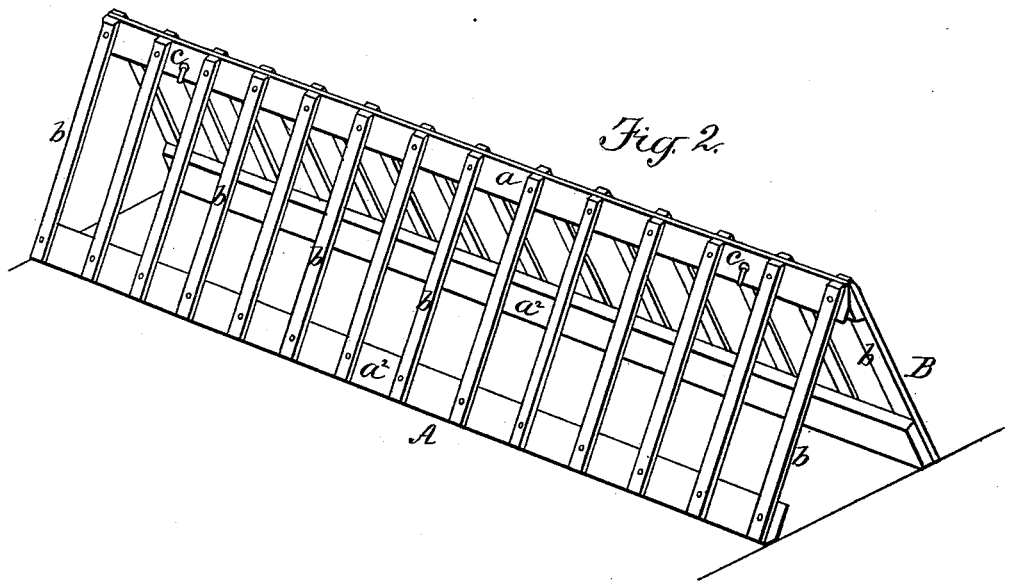
Figures 3, 5:
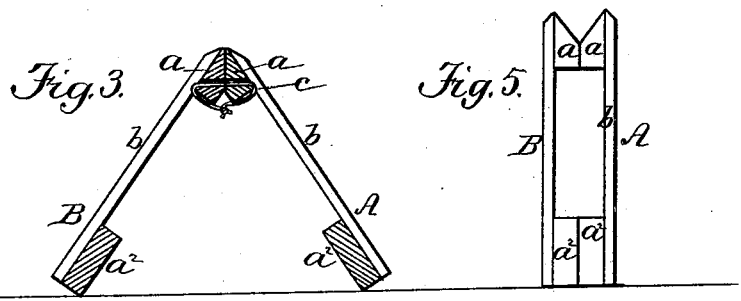
Figure 4:
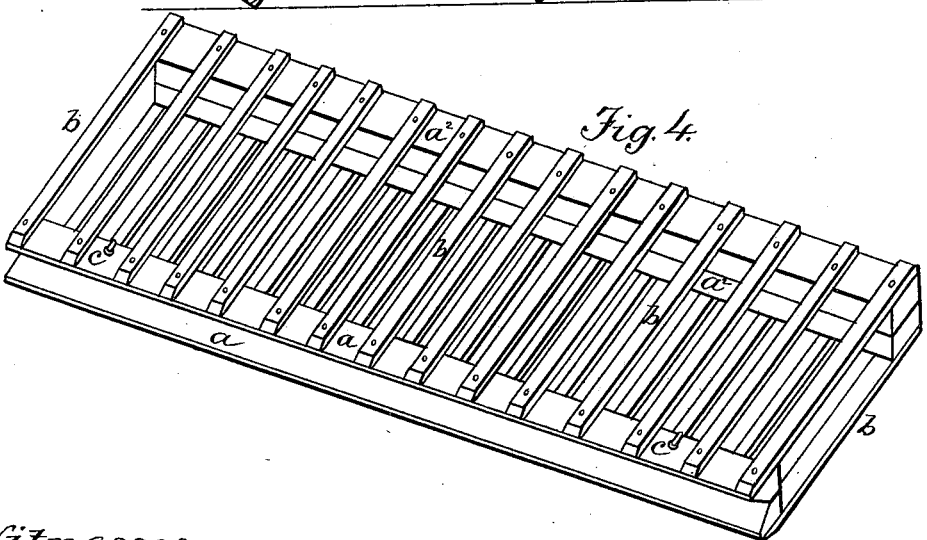

In the accompanying drawings, Figure 1 is a plan view of a poultry-house, its permanent runways, and portable creel, to which the portable inclosed runway structure is connected in sections end to end; Fig. 2, a perspective view of the portable runway; Fig. 3, a cross-section; Fig. 4, a perspective of the runway structure folded, and Fig. 5 an end view of same.

The improvement is a structure which may be called an "inclosed sectional runway" or "portable runway," one end of which communicates with either the doorway of the poultry-house C, or connected therewith, or with a permanent runway thereof, and from thence to a park or creel, E, where the fowls may forage. This inclosing runway-structure is not only built so as to be portable, but is capable of being folded into compact form for transportation and easy handling. It is built of any desired length of sections, each section being made in halves A and B, each half of two longitudinal strips, $a\,a^2$, with thin narrow slats or palings $b$ nailed at suitable distances apart upon the said longitudinal strips at top and bottom; or the closure may be made of wire-cloth, lattice, or open work of any kind of construction joining the said strips.

Viewing the cross-section, Fig. 3, the upper longitudinal strips are hinged together at $c\,c$ or other proper intervals, and in the structure herein described the hinge consists of a wire loop passing through holes in the lower parts of said top longitudinal strips. The inner meeting sides of the top longitudinal strips, $a$, are beveled sufficiently to permit of the inverted-V spread of the structure upon the ground, and to limit such spreading. This portable runway is adapted to be shut and closed like a book for storage or shipment or handling by one man. Being made in sections of suitable lengths, it may be extended in any direction and for any distance to wherever the forage-creel may be placed by placing the sections end to end.

The structure is rendered self-sustaining when spread by means of hinges of loop form placed so as to pass through and under the top strips like rings in connection with the beveling of the meeting sides of said strips above the loop-hinges.

I prefer to use a creel, E, of my own invention, as also to connect the said creel by this inclosed runway structure with a permanent runway, D, having a series of side gates, $d$, to any one of which it may be moved; yet it is obvious that this portable folding structure may be used in direct connection with the door of any poultry-house and of any creel.

It is important in the management of poultry-culture that all the appliances should be constructed so as to be easily handled, so that one man can make the required changes in the position of the runway to the forage-park, it being understood that the pathway stands at right angles with the permanent runway and communicates as it is moved with its successive side gateways, $d$, by one end and the doorway of the creel E by the other end.

I prefer to use a knockdown creel composed of separate parts interlocked, so as to be easily taken apart and put together, as described and shown in a separate application for a patent filed by me of even date under Serial No. 172,974, so that the creel, like the runway, can be handled by one man, and all the parts of these two devices can be packed together in a single stack for storage or transportation. They are made in lengths suitable for easy handling and convenient joining end for end.

I claim—

1. The herein-described runway structure for poultry-closures, consisting of the side frames of open-work having horizontal top strips beveled on their meeting sides, and loop-hinges connecting said top strips by being passed through and under the same, to allow the structure to be folded and rendered self-sustaining, as set forth.

2. The poultry-house runway herein described, consisting of the side frames composed of longitudinal top and bottom strips and slats, the former strips being beveled on their meeting sides, and the loop-hinges passing through and under said beveled strips, as described, for the purpose specified.

In testimony whereof I have hereunto set my hand in the presence of two subscribing witnesses.

J. GALUSHA STAUNTON.

Witnesses:
H. D. PERSONS,
I. W. HUMPHREY.